No. 638,406. Patented Dec. 5, 1899.
A. L. STONE.
MILK COOLER AND AERATOR.
(Application filed July 24, 1899.)
(No Model.)
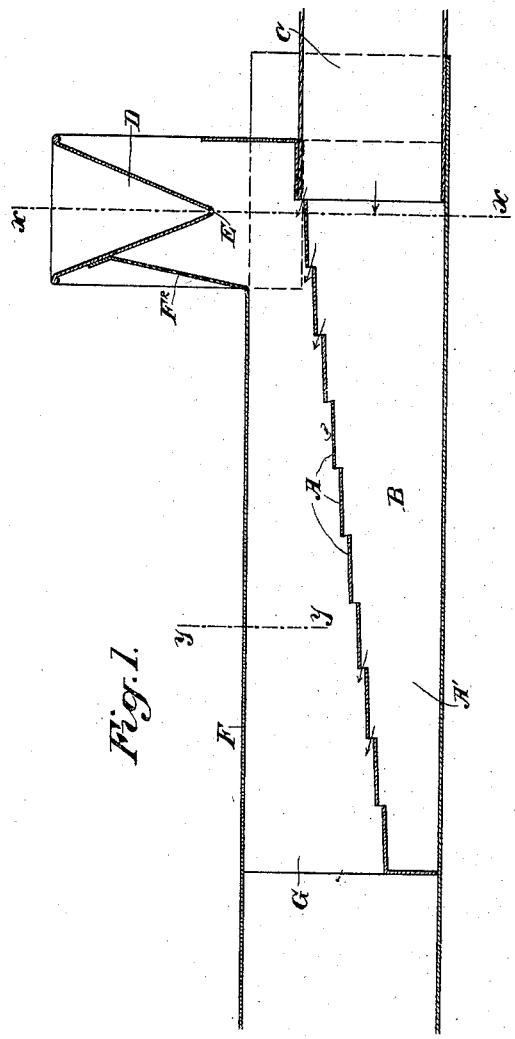
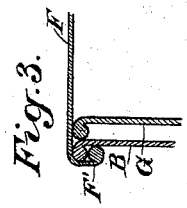
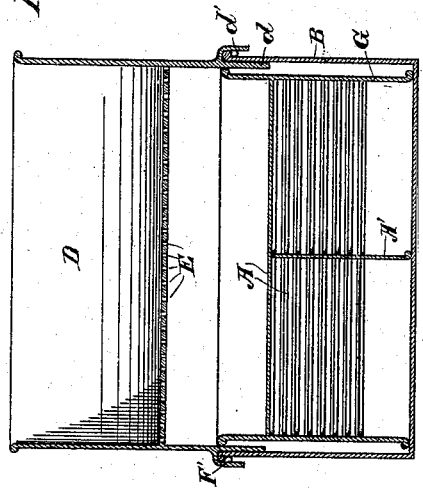
Witnesses,
Inventor,
Abraham L. Stone
By Dewey Strong & Co.
Attys

UNITED STATES PATENT OFFICE.

ABRAHAM L. STONE, OF SAN FRANCISCO, CALIFORNIA.

MILK COOLER AND AERATOR.

SPECIFICATION forming part of Letters Patent No. 638,406, dated December 5, 1899.

Application filed July 24, 1899. Serial No. 724,939. (No model.)

*To all whom it may concern:*

Be it known that I, ABRAHAM L. STONE, a citizen of the United States, residing in the city and county of San Francisco, State of California, have invented an Improvement in Milk Coolers and Aerators; and I hereby declare the following to be a full, clear, and exact description of the same.

My invention relates to an apparatus which is especially designed to cool and aerate milk.

It consists of the parts and the constructions and combinations of parts, which I shall hereinafter describe and claim.

Figure 1 is a vertical section of my apparatus. Fig. 2 is a transverse section taken through $x\ x$ of Fig. 1. Fig. 3 is a similar section on line $y\ y$ of Fig. 1.

The object of my invention is to provide a convenient apparatus for cooling and aerating milk.

The apparatus consists of a series of inclined surfaces A of any desired width transversely, depending on the quantity of milk to be passed over them. These surfaces are so disposed that from the lower end of the first and each succeeding surface there is a short drop of one-eighth of an inch, more or less, to the upper end of the next succeeding surface, so that milk flowing down over these surfaces falls in a thin sheet from the lower end of one to the upper end of the next. Below these surfaces is a chamber B, formed with sides, bottom, and open outer end, and into the rear or inner end of this chamber air is discharged from a fan-blower or other air-forcing mechanism through the passage, (shown at C.) The air thus discharged into the closed chamber B will pass out through the narrow channels or passages between the plates A, and as the milk falls from one to another the air will rapidly cool it and also aerate it. The milk to be delivered to this cooling device is first placed in a hopper-shaped receptacle D, having small perforations E along the bottom or V-shaped edge, and through these perforations the milk drips upon the uppermost of the surfaces A over the whole width from one side to the other, and is thus distributed in a thin sheet so as to flow down the inclines. Over these surfaces is fixed a cover F, which protects the milk from dust or foreign substances.

In order to readily put the parts together or separate them for the purpose of cleaning, I have shown the sides of the chamber B having a bead upon the upper edges. The hopper D is made with flanges $d$, projecting down inside of the sides B, and flanges $d'$, which project outside of the beads at the upper edges of the sides B. The surfaces or plates A have their edges connected with the side pieces G, and the width between these side pieces is sufficiently less than that between the sides B so that this portion of the structure may be slipped in or out the beads or upon the upper edges of the sides G, just fitting against the flanges $d$ of the hopper portion at the rear end. These parts thus brace and support each other and form a close joint at this point. The cover F is made with a downwardly and inwardly turned flange $F'$ upon each edge, so that when it is slipped over the part B these flanges engage with the beads at the upper edges of the side B and form a joint therewith, the inner end of this cover F being upturned, as shown at $F^2$, and abutting against the front side of the hopper D. Beneath the surfaces A one or more vertical supporting-partitions $A'$ extend longitudinally, the lower edges resting upon the bottom of the outer case B and serving to retain the surfaces over which the milk is to flow in a level condition transversely.

The apparatus is readily dismounted and separated by sliding off the cover F, then lifting out the hopper D, and finally withdrawing the structure which carries the surfaces A, when the whole apparatus can be readily inspected and cleaned.

Having thus described my invention, what I claim as new, and desire to secure by Letters Patent, is—

1. In a milk cooling and aerating apparatus, the combination with an outer casing, of a removable casing interior thereto and formed with side walls and inclined step-like surfaces, said removable casing having a closed chamber beneath the said surfaces with outlets between each pair of surfaces whereby air is discharged upwardly through the milk flowing over the surfaces, and means for supplying air to said closed chamber.

2. An apparatus for cooling and aerating milk consisting of a casing having side walls, a second structure having side walls, and inclined overlapping step-like surfaces extending horizontally from one wall to the other and slidable within the outer casing, a conductor through which air is delivered under pressure into the space beneath the overlapping surfaces, a hopper or supply having flanges fitting over the upper edges of the outer case and between it and the inner one, the cover slidable upon the outer case and abutting against the front of the hopper substantially as described.

In witness whereof I have hereunto set my hand.

ABRAHAM L. STONE.

Witnesses:
S. H. NOURSE,
JESSIE C. BRODIE.